US008656061B2

(12) United States Patent
Hidaka

(10) Patent No.: US 8,656,061 B2

(45) Date of Patent: Feb. 18, 2014

(54) DATA INPUT/OUTPUT DEVICE, INFORMATION PROCESSING DEVICE, AND DATA INPUT/OUTPUT METHOD

(75) Inventor: Isao Hidaka, Tokyo (JP)

(73) Assignee: Sony Corporation, Tokyo (JP)

(*) Notice: Subject to any disclaimer, the term of this patent is extended or adjusted under 35 U.S.C. 154(b) by 145 days.

(21) Appl. No.: 13/324,072

(22) Filed: Dec. 13, 2011

(65) Prior Publication Data

US 2012/0161854 A1 Jun. 28, 2012

(30) Foreign Application Priority Data

Dec. 24, 2010 (JP) ................................ 2010-288544

(51) Int. Cl.

*G06F 3/00* (2006.01)

*G06F 13/00* (2006.01)

(52) U.S. Cl.

USPC ............ 710/8; 710/2; 710/5; 710/15; 710/57

(58) Field of Classification Search

None

See application file for complete search history.

(56) References Cited

U.S. PATENT DOCUMENTS

2011/0057690 A1* 3/2011 Akita ........................... 327/144

* cited by examiner

*Primary Examiner* — Scott Sun

(74) *Attorney, Agent, or Firm* — Sony Corporation

(57) ABSTRACT

A data input/output device includes a buffer that accumulates data, and a data receiver that receives data input in synchronization with a first clock in accordance with a second clock whose generation source is different from a generation source of the first clock. The data input/output device further includes a data input part that accumulates data received by the data receiver in the buffer, and a data output part that sequentially outputs data accumulated in the buffer at an output interval depending on the amount of data accumulated in the buffer in such a manner that a predetermined data amount is the unit of the output.

13 Claims, 10 Drawing Sheets

(EXAMPLE OF SIGNALS INPUT TO LIQUID CRYSTAL PART)

(FLOW OF CLOCK)

(EXAMPLE OF EXTENSION OF BLANK PERIOD)

(EXAMPLE OF SHORTENING OF BLANK PERIOD)

DATA INPUT/OUTPUT DEVICE, INFORMATION PROCESSING DEVICE, AND DATA INPUT/OUTPUT METHOD

BACKGROUND

The present disclosure relates to a data input/output device, an information processing device, and a data input/output method.

Portable apparatus such as a cellular phone and a notebook PC is composed of a main body unit equipped with an operation part for operation by the user and a display unit equipped with a display device such as an LCD in many cases. Furthermore, a movable member is used as the hinge part to connect the main body unit to the display unit. Normally a power line and a signal line pass through this hinge part. Therefore, deterioration occurs in the lines passing through the hinge part in association with transformation of the hinge part. So, ingenuity to prevent the deterioration of the lines passing through the hinge part when the hinge part is transformed is required. The above-mentioned LCD is an abbreviation of the liquid crystal display.

To suppress the deterioration of the lines passing through the hinge part, first, it is important to reduce the number of lines passing through the hinge part. In the past, the parallel transmission system is frequently used for data transmission from the main body unit to the display unit. In the case of using the parallel transmission system, several tens or more of signal lines are required to be wired through the hinge part to transmit image data to be displayed on the display device. Therefore, there is a risk that distortion of the signal lines occurs in association with transformation of the hinge part and the power line and the signal line are broken. So, a method of applying the serial transmission system to data transmission through the hinge part has been devised instead of the parallel transmission system.

In the case of the serial transmission system, data is transmitted after being coded. As the coding system, e.g. the non-return-to-zero (NRZ) coding system, the Manchester coding system, or the alternate mark inversion (AMI) coding system is used. For example, Japanese Patent Laid-open No. Hei 3-109843 discloses a technique of transmitting data by utilizing the AMI code, which is a representative example of the bipolar code. Furthermore, this document discloses a technique in which a data clock is represented by the intermediate value of the signal level and transmitted, and the data clock is reproduced on the receiving side based on the signal level.

SUMMARY

If the serial transmission system is employed as described above, the flexibility of transformation of the hinge part increases and the design of the portable apparatus can be enhanced. Furthermore, the number of lines decreases and resistance to distortion and so forth is enhanced. Thus, the reliability of the lines passing through the hinge part is enhanced. However, in the case of the serial transmission system, the amount of data transmitted per one clock is smaller than that in the parallel transmission system and therefore a high-speed clock needs to be used to obtain the same data transmission speed. Particularly, the LCD mounted on recent portable terminals has a high resolution and therefore a very-high-speed clock needs to be used for serial transmission of image data to be displayed on the LCD.

The clock utilized for the serial transmission is generated by multiplying a reference clock on the serializer side. On the deserializer side, the clock utilized for data output is generated by dividing the frequency of the clock utilized for the serial transmission. The clock generated on the deserializer side should correspond with the clock utilized in data input to the serializer. However, the generation sources of these clocks are different from each other and therefore an error inevitably arises between both clocks. As a result, data may not be correctly reproduced on the deserializer side in some cases.

There is provided a novel, improved data input/output device, information processing device, and data input/output method that are capable of absorbing the frequency error between the input clock and the output clock.

According to one embodiment of the present disclosure, there is provided a data input/output device including a buffer configured to accumulate data, and a data receiver configured to receive data input in synchronization with a first clock in accordance with a second clock whose generation source is different from a generation source of the first clock. The data input/output device further includes a data input part configured to accumulate data received by the data receiver in the buffer, and a data output part configured to sequentially output data accumulated in the buffer at an output interval depending on the amount of data accumulated in the buffer in such a manner that a predetermined data amount is the unit of the output.

According to another embodiment of the present disclosure, there is provided an information processing device including an arithmetic processor configured to input data in synchronization with a first clock, a clock generator configured to generate a second clock, and a data receiver configured to receive data input from the arithmetic processor in synchronization with the first clock in accordance with the second clock generated by the clock generator. The information processing device further includes a data input part configured to accumulate data received by the data receiver in a buffer, a data output part configured to sequentially output data accumulated in the buffer at an output interval depending on the amount of data accumulated in the buffer in such a manner that a predetermined data amount is the unit of the output, and a display part configured to display an image based on data output by the data output part.

According to another embodiment of the present disclosure, there is provided a data input/output method of a data input/output device having a buffer for accumulating data. The method includes receiving data input in synchronization with a first clock in accordance with a second clock whose generation source is different from a generation source of the first clock, accumulating data received in the receiving in the buffer, and sequentially outputting data accumulated in the buffer at an output interval depending on the amount of data accumulated in the buffer in such a manner that a predetermined data amount is the unit of the output.

As described above, the embodiments of the present disclosure enable absorption of the frequency error between the input clock and the output clock. As a result, sufficient accuracy is obtained by a low-cost oscillator and the manufacturing cost and design cost of the device can be suppressed.

DETAILED DESCRIPTION OF THE PREFERRED EMBODIMENT

Figure 1:
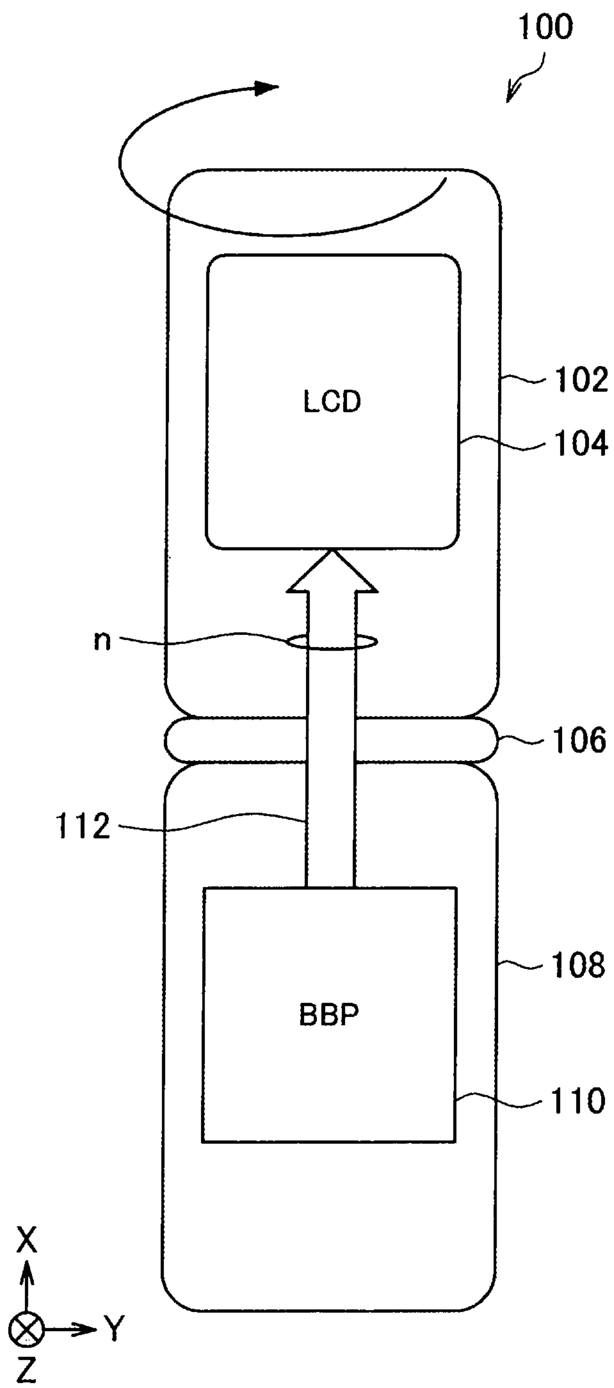
FIG. 1 is an explanatory diagram showing a configuration example of a portable terminal employing a parallel transmission system.

A preferred embodiment of the present disclosure will be described in detail below with reference to the accompanying drawings. In the present specification and the drawings, the constituent element having substantially the same functional configuration is given the same numeral and thereby overlapping description is omitted.

[Flow of Description]

A brief description will be made below about the flow of the description relating to the embodiment of the present disclosure to be described below. First, with reference to FIG. 1, the device configuration of a portable terminal 100 employing the parallel transmission system will be briefly described. Next, with reference to FIG. 2, the device configuration of a portable terminal 130 employing the serial transmission system will be briefly described. At this time, with reference to FIG. 3, the description will be supplemented regarding a data transmission method by the serial transmission system.

Next, with reference to FIG. 4, the configurations of an enable signal, a data signal, and a pixel clock that are output from a deserializer 170 and input to a liquid crystal part 104 will be described. Subsequently, with reference to FIG. 5, the configurations of clocks input to a serializer 150, a clock used for serial transmission, and a clock output from the deserializer 170 will be described. Next, with reference to FIG. 6, a data transmission method according to the present embodiment will be described.

Next, with reference to FIG. 7, the functional configurations of the serializer 150 and the deserializer 170 according to the present embodiment will be described. Subsequently, with reference to FIG. 8 and FIG. 9, a method for adjusting a blank period according to the present embodiment will be described. Next, with reference to FIG. 10, a buffering method according to the present embodiment will be described. At last, summarization will be made about the technical idea of the embodiment and operation and effect obtained from this technical idea will be briefly described.

DESCRIPTION ITEMS

1: Introduction 1-1: Device Configuration of Portable Terminal 100 Employing Parallel Transmission System 1-2: Device Configuration of Portable Terminal 130 Employing Serial Transmission System 2: Embodiment 2-1: Data Transmission Method 2-1-1: Configurations of Various Kinds of Signals 2-1-2: Flow of Clock 2-1-3: Flow of Data 2-2: Functional Configurations 2-2-1: Configuration of Serializer 150

2-2-2: Configuration of Deserializer 170

2-3: Method for Adjusting Blank Period 2-4: (Modification Example) One-row Buffering Method 3: Summarization <1: Introduction>

First, a brief description will be made below about the outline of the parallel transmission system, which has been frequently used thus far as the data transmission system in the apparatus, and the serial transmission system, which is now becoming prevalent, by taking as an example the device configurations of the portable terminals 100 and 130 employing the respective systems.

[1-1: Device Configuration of Portable Terminal 100 Employing Parallel Transmission System]

First, with reference to FIG. 1, the device configuration of the portable terminal 100 employing the parallel transmission system will be briefly described. FIG. 1 is an explanatory diagram showing one example of the device configuration of the portable terminal 100 employing the parallel transmission system. In FIG. 1, a cellular phone is schematically drawn as one example of the portable terminal 100. However, the application range of the technique to be described below is not limited to the cellular phone. For example, the technique can be applied also to information processing devices such as a notebook PC and various kinds of portable electronic apparatus.

As shown in FIG. 1, the portable terminal 100 is composed mainly of a display unit 102, a liquid crystal part 104 (LCD), a connecting part 106, an operation unit 108, a baseband processor 110 (BBP), and a parallel signal path 112. The LCD is an abbreviation of the liquid crystal display. The display unit 102 and the operation unit 108 will be often referred to as the display side and the main body side, respectively. Here, for convenience of description, the case in which a video signal is transmitted via the parallel signal path 112 is taken as an example. The kind of signal transmitted via the parallel signal path 112 is not limited thereto, of course, and includes also e.g. a control signal and an audio signal.

As shown in FIG. 1, the liquid crystal part 104 is provided in the display unit 102. First, a video signal transmitted via the parallel signal path 112 is input to the liquid crystal part 104. The liquid crystal part 104 displays video based on the input video signal. The connecting part 106 is a component to connect the display unit 102 to the operation unit 108. The connecting member forming this connecting part 106 has e.g. such a structure as to be capable of rotating the display unit 102 by 180 degrees in the Z-Y plane. This connecting member may be so formed as to be capable of rotating the display unit 102 in the X-Z plane. In this case, the portable terminal 100 has a foldable structure. This connecting member may have such a structure as to allow the display unit 102 to be moved in a free direction.

The baseband processor 110 is an arithmetic processor that offers communication control of the portable terminal 100 and an application execution function. A parallel signal output from the baseband processor 110 is transmitted to the liquid crystal part 104 of the display unit 102 via the parallel signal path 112. In the parallel signal path 112, a large number of signal lines are wired. For example, the number n of signal lines is about 50 in a cellular phone. The transmission speed of the video signal is about 130 Mbps if the resolution of the liquid crystal part 104 is QVGA. The parallel signal path 112 is so wired as to pass through the connecting part 106.

That is, in the connecting part 106, a large number of signal lines forming the parallel signal path 112 are wired. If the movement range of the connecting part 106 is widened as described above, the risk that the parallel signal path 112 is damaged due to the movement of the connecting part 106 becomes higher. Therefore, the reliability of the parallel signal path 112 is lowered. If keeping the reliability of the parallel signal path 112 is attempted, the movement range of the connecting part 106 is limited and the design and functionality of the portable terminal 100 are lowered. For this reason, a mechanism to enhance the flexibility of the movable member forming the connecting part 106 and the reliability of the parallel signal path 112 is required. So, the serial transmission system to be described later is devised.

This is the end of the description of the device configuration of the portable terminal 100 employing the parallel transmission system.

[1-2: Device Configuration of Portable Terminal 130 Employing Serial Transmission System]

Figure 2:
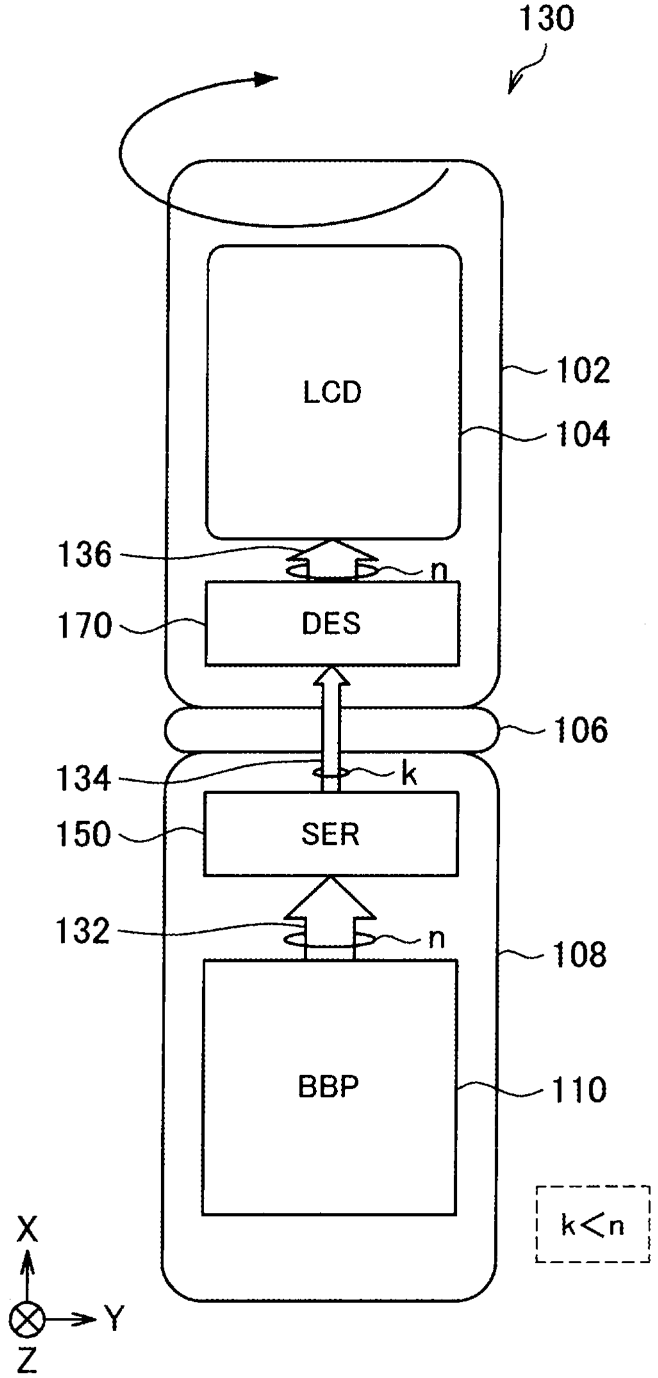
FIG. 2 is an explanatory diagram showing a configuration example of a portable terminal employing a serial transmission system.

With reference to FIG. 2, the device configuration of the portable terminal 130 employing the serial transmission system will be briefly described. FIG. 2 is an explanatory diagram showing one example of the device configuration of the portable terminal 130 employing the serial transmission system.

In FIG. 2, a cellular phone is schematically drawn as one example of the portable terminal 130. However, the application range of the technique to be described below is not limited to the cellular phone. For example, the technique can be applied also to information processing devices such as a notebook PC and various kinds of portable electronic apparatus. The constituent element having substantially the same function as that of the constituent element in the portable terminal 100 employing the parallel transmission system is given the same numeral and thereby its detailed description is omitted.

As shown in FIG. 2, the portable terminal 130 has mainly the display unit 102, the liquid crystal part 104 (LCD), the connecting part 106, and the operation unit 108. Furthermore, the portable terminal 130 has the baseband processor 110 (BBP), parallel signal paths 132 and 136, a serial signal path 134, the serializer 150, and the deserializer 170.

The portable terminal 130 transmits a video signal by the serial transmission system via the serial signal path 134 wired through the connecting part 106, differently from the above-described portable terminal 100. For this purpose, the serializer 150 to serialize a parallel signal output from the baseband processor 110 is provided in the operation unit 108. In the display unit 102, the deserializer 170 to parallelize a serial signal transmitted via the serial signal path 134 is provided.

The serializer 150 converts the parallel signal that is output from the baseband processor 110 and input via the parallel signal path 132 to the serial signal. For example, as shown in FIG. 3, signal A, signal B, signal C, and signal D are input to the serializer 150 in parallel in synchronization with a parallel signal clock (P-CLK).

Figure 3:
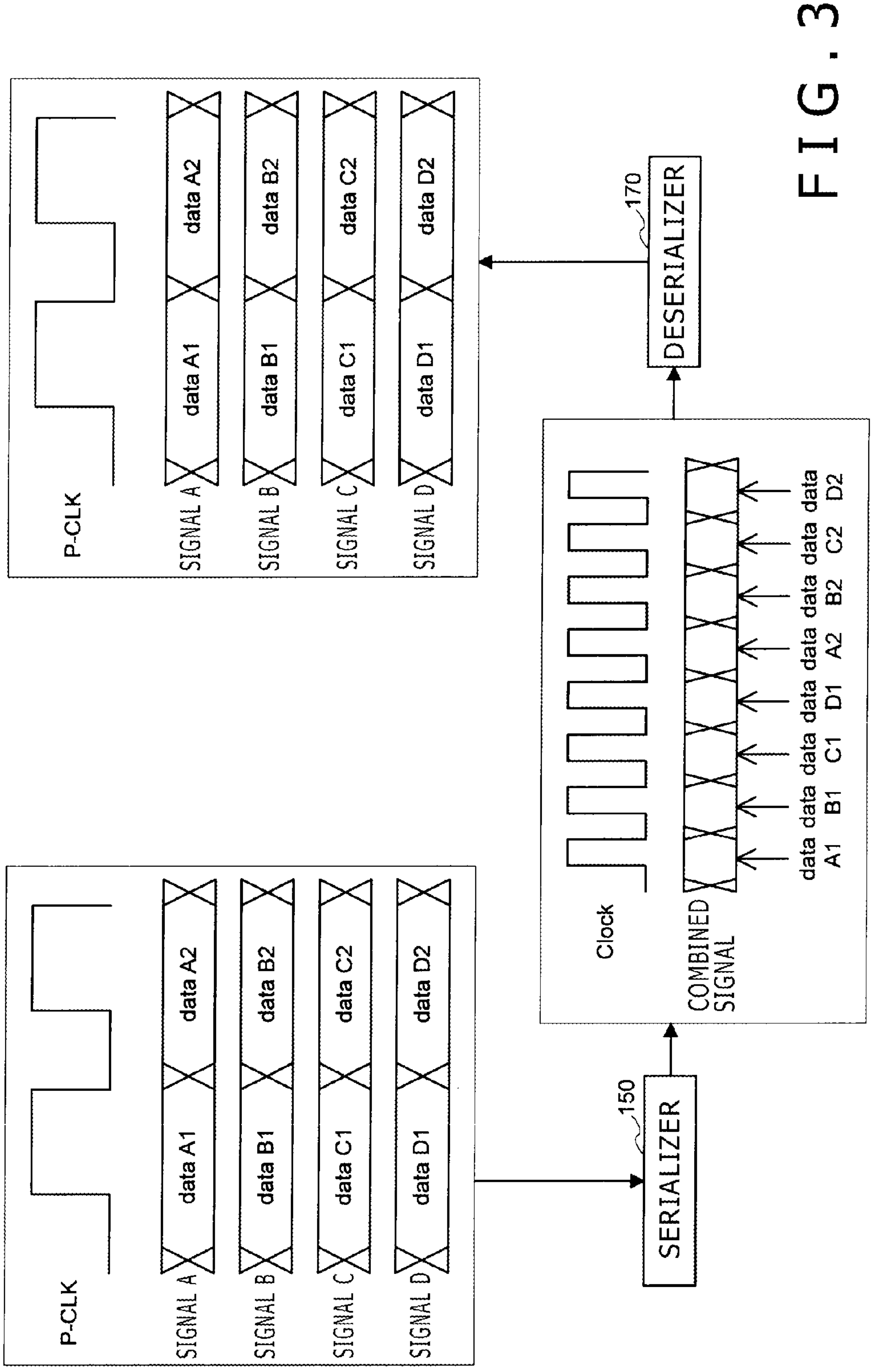
FIG. 3 is an explanatory diagram showing one example of a transmission method by the serial transmission system.

In the example of FIG. 3, signal A includes data A1 and data A2 and signal B includes data B1 and data B2. Furthermore, signal C includes data C1 and data C2 and signal D includes data D1 and data D2.

The serializer 150 combines data A1, A2, B1, B2, C1, C2, D1, and D2 included in signal A, signal B, signal C, and signal D in series to generate a combined signal synchronized with a serial signal clock (Clock) having the frequency four times that of the parallel signal. This combined signal is the serial signal. The serial signal obtained by the serializer 150 is input to the deserializer 170 via the serial signal path 134.

In response to the input of the serial signal, the deserializer 170 separates the respective data from the input serial signal to restore the parallel signal. Furthermore, the deserializer 170 inputs the parallel signal to the liquid crystal part 104 via the parallel signal path 136. To the serial signal path 134, a clock may be transmitted together with the serial signal (data signal) obtained by combining signal A, signal B, signal C, signal D, and so forth. The serial signal may be transmitted by a transmission system by use of a differential signal such as a low voltage differential signal (LVDS).

By employing the serial transmission system in this manner, the number k of lines of the serial signal path 134 can be set to a number greatly smaller than the number n of lines of the parallel signal path 112 possessed by the portable terminal 100 of FIG. 1 ($1 \leq k \ll n$). For example, the lines of the serial signal path 134 (k) can be reduced to at most several lines. As a result, the flexibility relating to the movement range of the connecting part 106 through which the serial signal path 134 is wired can be made much higher than that of the connecting part 106 through which the parallel signal path 112 is wired. Furthermore, the reliability of the serial signal path 134 is also enhanced.

This is the end of the description of the device configuration of the portable terminal 130 employing the serial transmission system.

<2: Embodiment>

One embodiment of the present disclosure will be described below. The present embodiment relates to a technique to absorb the frequency error between the clock used in data output from the baseband processor 110 and the clock used in data input to the liquid crystal part 104.

[2-1: Data Transmission Method]

The configurations of the signals input to the liquid crystal part 104, the configurations of the clocks flowing on the path from the baseband processor 110 to the liquid crystal part 104, and the configuration of data will be described below.

(2-1-1: Configurations of Various Kinds of Signals)

Figure 4:
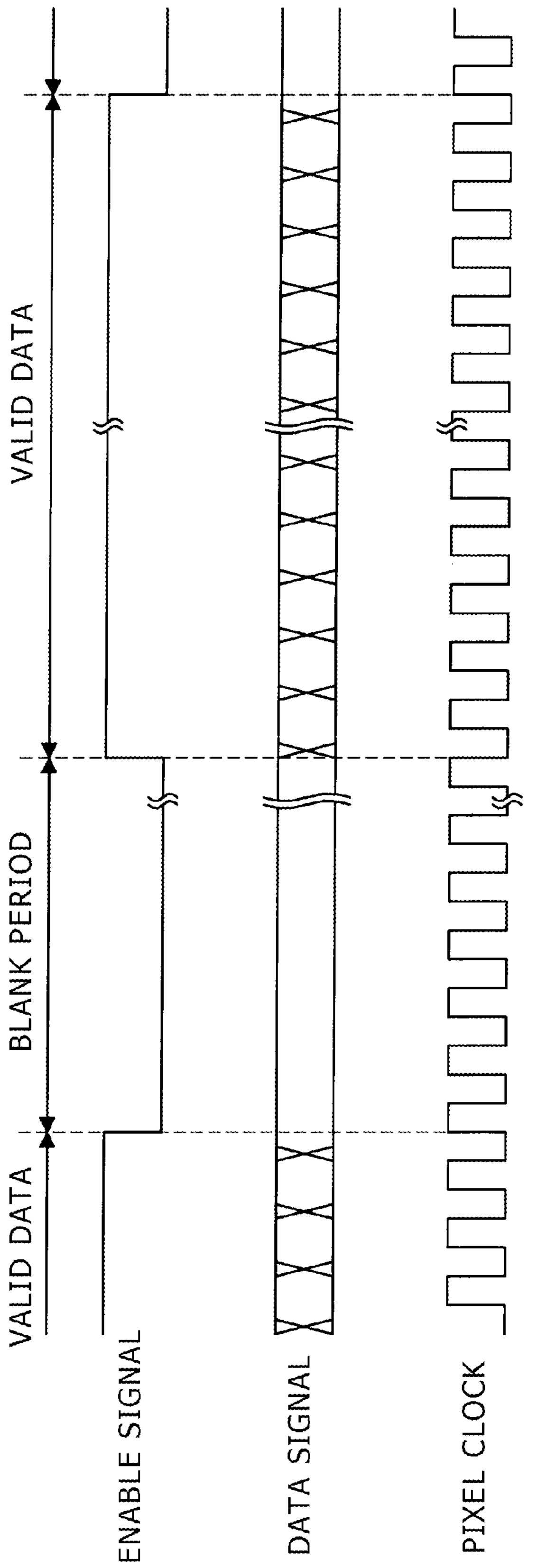
FIG. 4 is an explanatory diagram for explaining the configurations of an enable signal, a data signal, and a pixel clock output from a deserializer.

As shown in FIG. 4, an enable signal, a data signal, and a pixel clock are input to the liquid crystal part 104. This pixel clock is a reference clock always input to the liquid crystal part 104. The data signal is input to the liquid crystal part 104 in synchronization with this pixel clock. However, this data signal is input to the liquid crystal part 104 only during the period when the enable signal is in the active state (in the example of FIG. 4, high-level state) (hereinafter, valid data period). That is, the data signal is not input to the liquid crystal part 104 during the period when the enable signal is in the inactive state (in the example of FIG. 4, low-level state) (hereinafter, blank period).

Normally screen data for one row is input in one period during which the enable signal is continuously in the active state (one valid data period). By repetition of a predetermined number of valid data periods, the screen data for one screen is input to the liquid crystal part 104. The enable signal, the data signal, and the pixel clock are always input to the serializer 150. The serializer 150 serializes the data signal corresponding to the valid data periods and transmits the serialized data signal to the deserializer 170.

The deserializer 170 parallelizes the data signal received from the serializer 150. Furthermore, the deserializer 170 generates the pixel clock and the enable signal based on the signal received from the serializer 150. The enable signal, the data signal, and the pixel clock transmitted from the serializer 150 to the deserializer 170 in this manner are input to the liquid crystal part 104.

(2-1-2: Flow of Clock)

Figure 5:
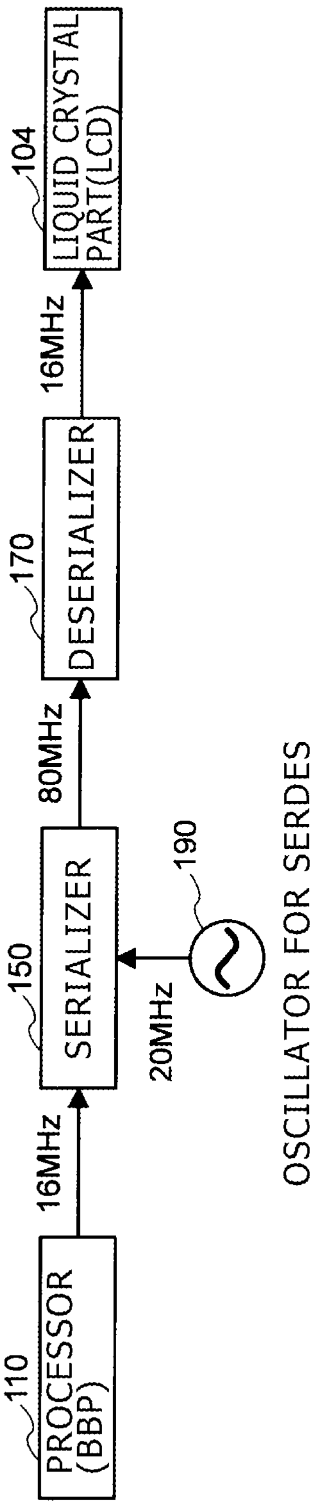
FIG. 5 is an explanatory diagram for explaining the configurations of clocks input to a serializer, a clock used for serial transmission, and a clock output from the deserializer.

With reference to FIG. 5, the relationship between the clock used for the output of the data signal and the clock used for the serial transmission of the data signal will be described below. For example, suppose that four data signals are output from the baseband processor 110 in synchronization with the pixel clock of 16 MHz. That is, the data signals are input to the serializer 150 at a speed of 16 MHz×4 bit=64 Mbps.

Furthermore, suppose that a clock of 20 MHz is input from an oscillator 190 to the serializer 150 as shown in FIG. 5. In this case, the serializer 150 receives the data signals in accordance with the clock of 20 MHz input from the oscillator 190. Furthermore, the serializer 150 multiplies the clock of 20 MHz input from the oscillator 190 to the frequency four times the original frequency to generate a clock of 80 MHz for example.

Moreover, the serializer 150 serializes four data signals to generate a serial signal. Subsequently, the serializer 150 transmits the serial signal to the deserializer 170 by using the generated clock of 80 MHz. The deserializer 170 reproduces the clock of 80 MHz based on the serial signal received from the serializer 150. Furthermore, the deserializer 170 divides the frequency of the clock of 80 MHz to ⅕ to generate a clock of 16 MHz. In addition, the deserializer 170 parallelizes the serial signal to reproduce four data signals. Subsequently, the deserializer 170 inputs four data signals to the liquid crystal part 104 in accordance with the generated clock of 16 MHz.

In this manner, the clock used for the serial transmission is generated by multiplying the clock generated by the oscillator 190. The clock used in the input of the data signal to the liquid crystal part 104 is generated by dividing the frequency of the clock used for the serial transmission. The clock used in the output of the data signal from the baseband processor 110 is generated by the baseband processor 110. That is, the generation source differs between the clock used for the output of the data signal (hereinafter, output clock) and the clock used for the input of the data signal to the liquid crystal part 104 (hereinafter, input clock).

In the example of FIG. 5, the output clock is 16 MHz and the clock used for transmission of the serial signal is 80 MHz. Furthermore, the input clock is 80 MHz/5=16 MHz. Therefore, the input clock corresponds with the output clock. However, the input clock is divergent from the output clock if the clock output from the baseband processor 110 is not accurately 16 MHz or if the clock output from the oscillator 190 is not accurately 20 MHz. If the input clock is divergent from the output clock, data is not output in the period during which the data should be output originally and imperfection of capturing of the data that should be output occurs. The present embodiment provides a technique to prevent the occurrence of such problems.

(2-1-3: Flow of Data)

Figure 6:
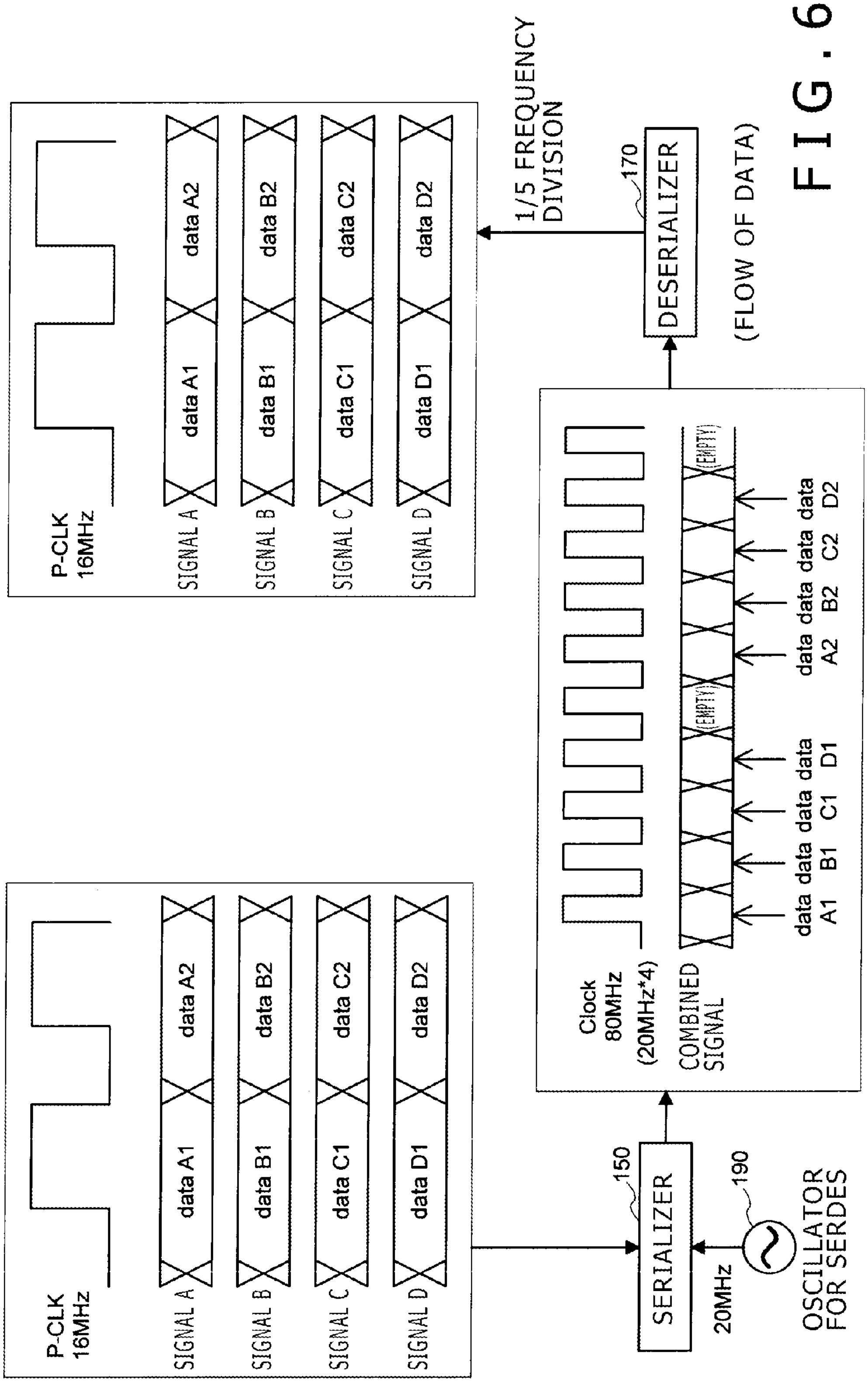
FIG. 6 is an explanatory diagram showing one example of a data transmission method according to one embodiment of the present disclosure.

With reference to FIG. 6, the method for transmitting the data signal by the serializer 150 and the deserializer 170 will be described in detail below.

As shown in FIG. 6, the data signal is input to the serializer 150 in accordance with the pixel clock of 16 MHz for example. At this time, four data signals (signal A, signal B, signal C, and signal D) are input to the serializer 150 in parallel. When four data signals are input, the serializer 150 performs serial transmission of the data signal in accordance with a clock of 80 MHz generated by multiplying the clock of 20 MHz input from the oscillator 190 by four. At this time, an empty area is interposed at a rate of one clock per five clocks as shown in FIG. 6. The deserializer 170 divides the frequency of the clock of 80 MHz to ⅕ to generate a clock of 16 MHz, and outputs four data signals in parallel in accordance with this clock.

In the example of FIG. 6, the frequency of the clock used in the input of four data signals to the serializer 150 is 16 MHz and the frequency of the clock input from the oscillator 190 is 20 MHz. Therefore, the data is correctly transmitted because of a relationship of 16 MHz×5=20 MHz×4=80 MHz. However, satisfaction of this relationship between the frequencies is based on the premise that the frequency of the clock used in the input of four data signals to the serializer 150 is accurately 16 MHz and the frequency of the clock input from the oscillator 190 to the serializer 150 is accurately 20 MHz.

However, the oscillator capable of accurately outputting a clock of a predetermined frequency is expensive. Therefore, normally an oscillator that outputs a clock roughly having the predetermined frequency is used. Such a low-price oscillator often outputs a clock of 16.1 MHz or 15.9 MHz although originally it should output a clock of 16.0 MHz for example. Similarly, a low-price oscillator often outputs a clock of 20.1 MHz or 19.9 MHz although originally it should output a clock of 20.0 MHz.

For example, suppose that a clock of 20.0 MHz is input from the oscillator 190 to the serializer 150 and a clock of 16.1 MHz is input from the baseband processor 110 to the serializer 150. In this case, the frequency of the clock input from the baseband processor 110 to the serializer 150 (16.1 MHz) is higher than that of the clock input from the deserializer 170 to the liquid crystal part 104 (20.0 MHz×⅘=16.0 MHz) (overflow). That is, the speed of the data input to the deserializer 170 is higher than that of the data output from the deserializer 170 to the liquid crystal part 104. In this case, data that is not output to the liquid crystal part 104 exists (imperfection of capturing of data).

Conversely, suppose that a clock of 20.0 MHz is input from the oscillator 190 to the serializer 150 and a clock of 15.9 MHz is input from the baseband processor 110 to the serializer 150. In this case, the frequency of the clock input from the baseband processor 110 to the serializer 150 (15.9 MHz) is lower than that of the clock input from the deserializer 170 to the liquid crystal part 104 (16.0 MHz) (underflow). That is, the speed of the data input to the deserializer 170 is lower than that of the data output from the deserializer 170 to the liquid crystal part 104. In this case, a period in which the data that should be output to the liquid crystal part 104 is absent.

The present embodiment relates to a method for avoiding imperfection of capturing of input data and the existence of a period in which the data that should be output is absent even when the above-described overflow or underflow occurs.

[2-2: Functional Configurations]

Figure 7:
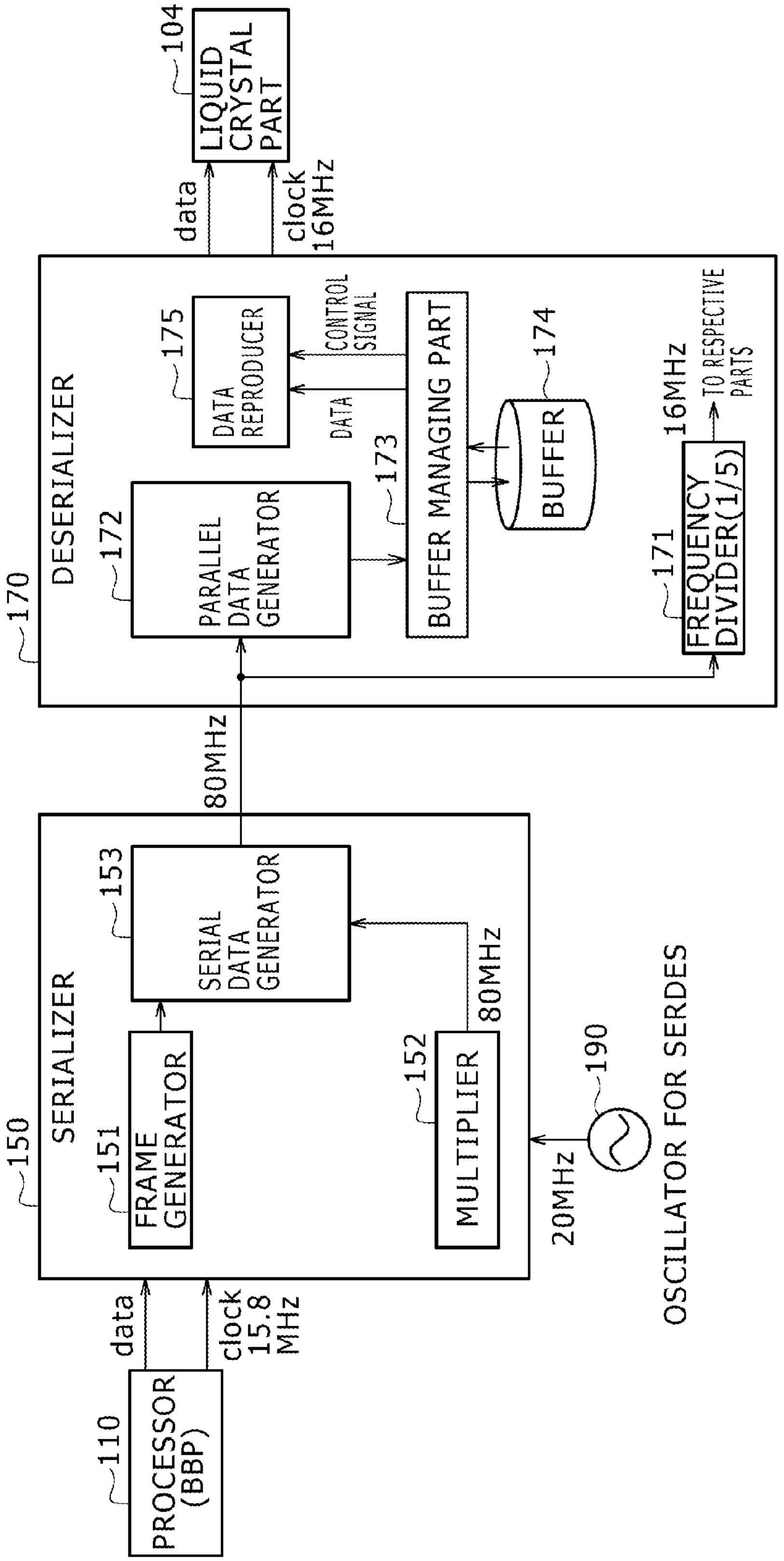
FIG. 7 is an explanatory diagram showing the configurations of a serializer and a deserializer according to the embodiment.

With reference to FIG. 7, the functional configurations of the serializer 150 and the deserializer 170 according to the present embodiment will be described below. FIG. 7 is an explanatory diagram for explaining the functional configurations of the serializer 150 and the deserializer 170 according to the present embodiment.

(2-2-1: Configuration of Serializer 150)

First, the functional configuration of the serializer 150 will be described.

The following description is based on the assumption that a data signal (data) and a clock of 15.8 MHz (clock, hereinafter input clock) are input from the baseband processor 110 to the serializer 150. The data signal and the input clock are input at the timing described in FIG. 4. Furthermore, a clock of 20 MHz (hereinafter, reference clock) is input from the oscillator 190 to the serializer 150. Moreover, a clock of 80

MHz (hereinafter, transmission clock) is used for serial transmission from the serializer 150 to the deserializer 170.

As shown in FIG. 7, the serializer 150 is composed mainly of a frame generator 151, a multiplier 152, and a serial data generator 153. The respective constituent elements operate by utilizing the reference clock.

When the data signal equivalent to screen data for one row is input from the baseband processor 110 to the serializer 150, the frame generator 151 buffers the input data signal. The multiplier 152 multiplies the reference clock input from the oscillator 190 by four to generate the transmission clock of 80 MHz. This transmission clock is input to the serial data generator 153. The serial data generator 153 serializes the data signal buffered in the frame generator 151 to generate a serial signal. Subsequently, the serial data generator 153 transmits the serial signal to the deserializer 170 in accordance with the transmission clock of 80 MHz.

This is the end of the description of the functional configuration of the serializer 150.

(2-2-2: Configuration of Deserializer 170)

The functional configuration of the deserializer 170 will be described below.

As shown in FIG. 7, the deserializer 170 is composed mainly of a frequency divider 171, a parallel data generator 172, a buffer managing part 173, a buffer 174 (storing part), and a data reproducer 175.

When the serial signal is received from the serializer 150, the frequency divider 171 divides the frequency of the transmission clock obtained from the serial signal to ⅕ to generate a clock of 16 MHz (hereinafter, reproduction clock). This reproduction clock is input to the respective constituent elements of the deserializer 170. The parallel data generator 172 parallelizes the serial signal to reproduce the data signal. This data signal is input to the buffer managing part 173. In response to the input of the data signal, the buffer managing part 173 stores the input data signal in the buffer 174. Furthermore, the buffer managing part 173 reads out the data signal from the buffer 174 at a predetermined timing and inputs it to the data reproducer 175.

At this time, the buffer managing part 173 regards the data signal equivalent to the screen data for one row as one unit and inputs the data signal to the data reproducer 175 one unit by one unit. Furthermore, the buffer managing part 173 inputs a control signal indicating the reading interval of the data signal to the data reproducer 175. This reading interval of the data signal is equivalent to the blank period of the screen data. That is, this control signal is a signal indicating the length of the blank period (represented by the number of clocks of the reproduction clock for example). When the data signal and the control signal are input, the data reproducer 175 inputs the input data signal to the liquid crystal part 104 in accordance with the reproduction clock. At this time, the data reproducer 175 adjusts the input timing of the data signal in consideration of the blank period indicated by the control signal.

This is the end of the description of the functional configuration of the deserializer 170.

[2-3: Method for Adjusting Blank Period]

Figure 8:
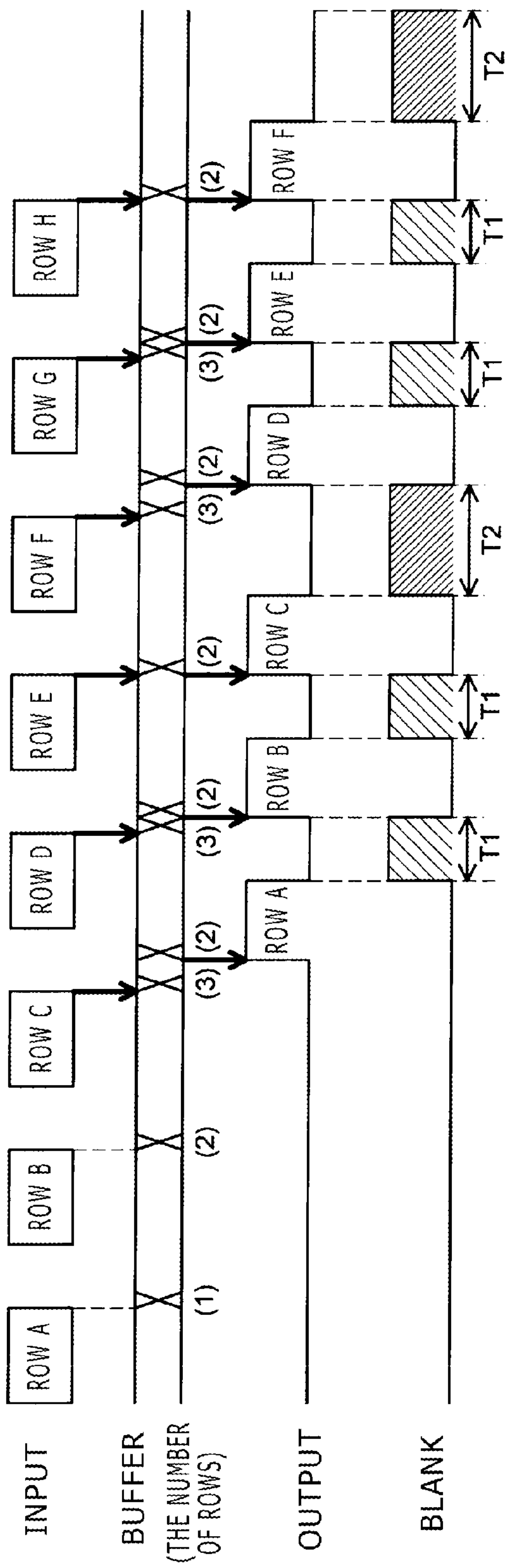
FIG. 8 is an explanatory diagram for explaining a method for adjusting a blank period according to the embodiment.
Figure 9:
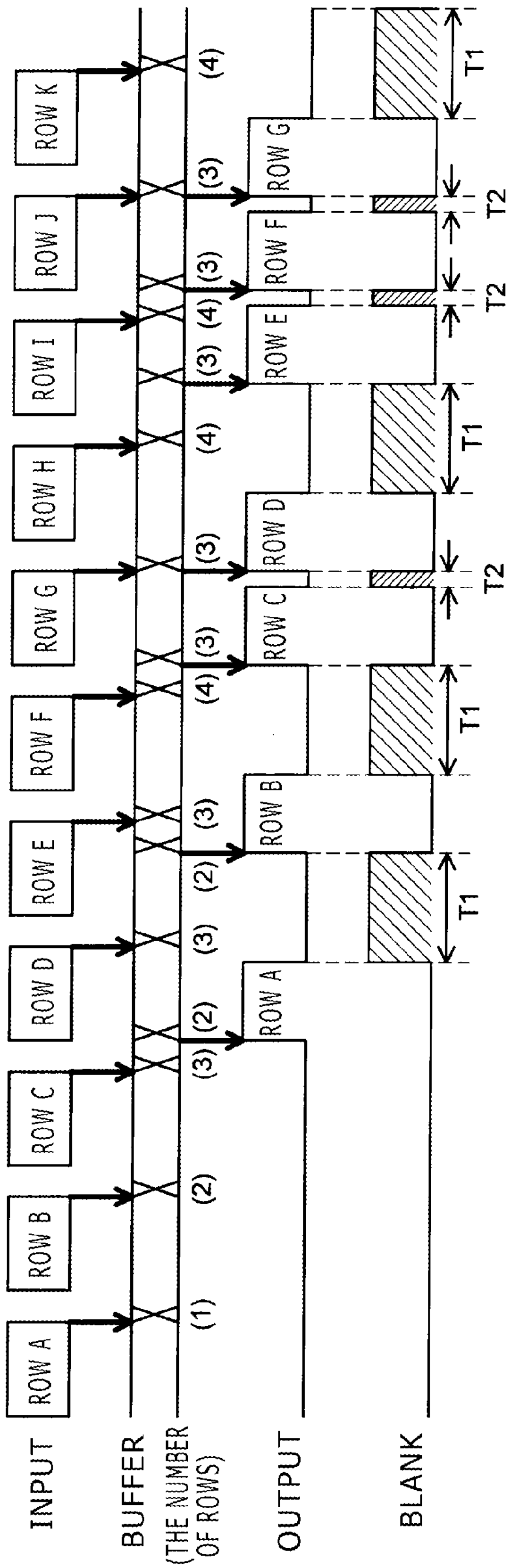
FIG. 9 is an explanatory diagram for explaining the method for adjusting the blank period according to the embodiment.

With reference to FIG. 8 and FIG. 9, the method for buffering the data signal will be described in detail below. Particularly, a method for adjusting the timing of output of the data signal from the buffer 174 depending on the input speed of the data signal input to the buffer managing part 173 will be described. The adjustment of the timing to be described below is equivalent to adjustment of the blank period of the screen data.

(Example of Extension of Blank Period)

First, the description will be made with reference to FIG. 8. FIG. 8 shows a timing chart of the data signals input to the buffer managing part 173 (data signals corresponding to the screen data of row A, row B, . . . , row H, . . . ), the data signals stored in the buffer 174, the data signals output from the buffer 174, and the blank period (output interval of the data signal). The example of FIG. 8 shows an underflow case, in which the speed of the output clock is higher than that of the input clock.

When the data signals corresponding to the screen data of row A, row B, . . . , row H, . . . are input, the buffer managing part 173 sequentially stores the data signals in the buffer 174. After a predetermined number of data signals (in the example of FIG. 8, data signals for three rows) are accumulated in the buffer 174, the buffer managing part 173 sequentially outputs the data signals stored in the buffer 174. At this time, the buffer managing part 173 reads out the data signals from the buffer 174 at predetermined intervals (in the example of FIG. 8, T1 and T2) and outputs the data signals to the data reproducer 175.

For example, when the data signals for three rows are accumulated in the buffer 174, the buffer managing part 173 outputs the data signals from the head in the same order as that of the storing in the buffer 174. In the example of FIG. 8, after storing the data signals of row A, row B, and row C in the buffer 174, the buffer managing part 173 outputs the data signal of row A. When the data signal of row A is output, the data amount of the data signals stored in the buffer 174 becomes the amount corresponding to two rows. After ending the output of the data signal of row A, the buffer managing part 173 stops the output for a predetermined period T1. Because the data signal of row D is input in this period, the buffer managing part 173 stores the input data signal of row D in the buffer 174. When the data signal of row D is stored in the buffer 174, the data amount of the data signals stored in the buffer 174 becomes the amount corresponding to three rows.

Upon the elapse of the predetermined period T1 after the end of the output of the data signal of row A, the buffer managing part 173 outputs the data signal of row B. When the data signal of row B is output, the data amount of the data signals stored in the buffer 174 becomes the amount corresponding to two rows. After ending the output of the data signal of row B, the buffer managing part 173 stops the output for the predetermined period T1. Because the data signal of row E is input in this period, the buffer managing part 173 stores the input data signal of row E in the buffer 174. When the data signal of row E is stored in the buffer 174, the data amount of the data signals stored in the buffer 174 becomes the amount corresponding to three rows. However, in the example of FIG. 8, the output of row C is started at the timing when the data signal of row E is stored in the buffer 174. Thus, the data amount of the data signals stored in the buffer 174 becomes the amount corresponding to two rows.

It is expected that, if the data signal of row D is output after the predetermined period T1 as heretofore, the data amount of the data signals stored in the buffer 174 becomes the amount corresponding to one row. Furthermore, if the output of the data signal is repeated without changing the predetermined period T1, the data amount of the data signals stored in the buffer 174 will become zero. So, the buffer managing part 173 stops the output for a predetermined period T2 longer than the predetermined period T1 (T2>T1) after ending the output of the data signal of row C. This predetermined period T2 is so set that the period from the output start timing of row C to the output start timing of row D is longer than the period from the input start timing of row E to the input start timing of row F.

If the period is set in this manner, the input of row F is started before the output start timing of row D. Thus, the data amount of the data signals stored in the buffer 174 becomes the amount corresponding to three rows before the output start timing of row D.

Similarly, input of row G, row H, . . . and output of row E, row F, . . . are carried out. In this manner, the output timing is adjusted depending on the data amount of the data signals stored in the buffer 174. This makes it possible to keep the state in which the appropriate amount of data signals is stored in the buffer 174. Furthermore, by buffering the data signal in the buffer 174, the occurrence of the problem that the screen data is not output in the period during which the screen data should be output is avoided even in the underflow state.

(Example of Shortening of Blank Period)

Next, the description will be made with reference to FIG. 9. FIG. 9 shows a timing chart of the data signals input to the buffer managing part 173 (data signals corresponding to the screen data of row A, row B, . . . , row H, . . . ), the data signals stored in the buffer 174, the data signals output from the buffer 174, and the blank period (output interval of the data signal). The example of FIG. 9 shows an overflow case, in which the speed of the output clock is lower than that of the input clock.

When the data signals corresponding to the screen data of row A, row B, . . . , row H, . . . are input, the buffer managing part 173 sequentially stores the data signals in the buffer 174. After a predetermined number of data signals (in the example of FIG. 9, data signals for three rows) are accumulated in the buffer 174, the buffer managing part 173 sequentially outputs the data signals stored in the buffer 174. At this time, the buffer managing part 173 reads out the data signals from the buffer 174 at predetermined intervals (in the example of FIG. 9, T1 and T2) and outputs the data signals to the data reproducer 175.

For example, when the data signals for three rows are accumulated in the buffer 174, the buffer managing part 173 outputs the data signals from the head in the same order as that of the storing in the buffer 174. In the example of FIG. 9, after storing the data signals of row A, row B, and row C in the buffer 174, the buffer managing part 173 outputs the data signal of row A. When the data signal of row A is output, the data amount of the data signals stored in the buffer 174 becomes the amount corresponding to two rows. After ending the output of the data signal of row A, the buffer managing part 173 stops the output for the predetermined period T1. Because the data signal of row D is input in this period, the buffer managing part 173 stores the input data signal of row D in the buffer 174. When the data signal of row D is stored in the buffer 174, the data amount of the data signals stored in the buffer 174 becomes the amount corresponding to three rows.

Upon the elapse of the predetermined period T1 after the end of the output of the data signal of row A, the buffer managing part 173 outputs the data signal of row B. When the data signal of row B is output, the data amount of the data signals stored in the buffer 174 becomes the amount corresponding to two rows. After ending the output of the data signal of row B, the buffer managing part 173 stops the output for the predetermined period T1. Because the data signals of row E and row F are input in the period from the start of the output of row B to the start of the output of row C, the buffer managing part 173 stores the input data signals of row E and row F in the buffer 174. When the data signals of row E and row F are stored in the buffer 174, the data amount of the data signals stored in the buffer 174 becomes the amount corresponding to four rows.

After the elapse of the predetermined period T1, the buffer managing part 173 outputs the data signal of row C. When the data signal of row C is output, the data amount of the data signals stored in the buffer 174 becomes the amount corresponding to three rows. However, it is expected that, if the output is stopped for the predetermined period T1 after the end of the output of the data signal of row C, the data amount of the data signals stored in the buffer 174 becomes the amount corresponding to five rows. Furthermore, if the output of the data signal is repeated without changing the predetermined period T1, the data amount of the data signals stored in the buffer 174 will gradually increase.

So, the buffer managing part 173 stops the output for the predetermined period T2 shorter than the predetermined period T1 (T2<T1) after ending the output of the data signal of row C. This predetermined period T2 is so set that the period from the output start timing of row C to the output start timing of row D is shorter than the period from the input start timing of row F to the input start timing of row G. If the period is set in this manner, the input of row G is not started before the output start timing of row D. Thus, the data amount of the data signals stored in the buffer 174 does not increase before the output start timing of row D.

Similarly, input of row G, row H, . . . and output of row D, row E, . . . are carried out. In this manner, the output timing is adjusted depending on the data amount of the data signals stored in the buffer 174. This makes it possible to keep the state in which the appropriate amount of data signals is stored in the buffer 174. Furthermore, by buffering the data signal in the buffer 174, imperfection of capturing of the screen data can be avoided even in the overflow state.

[2-4: (Modification Example) One-Row Buffering Method]

In the above description, the method for suppressing the influence of overflow and underflow by storing the data signal corresponding to the screen data for plural rows in the buffer 174 has been explained. In the following, with reference to FIG. 10, a description will be made about a method for suppressing the influence of overflow and underflow by utilizing the buffer 174 (FIFO) whose storable data amount is the data amount of the data signal corresponding to the screen data for one row.

Figure 10:
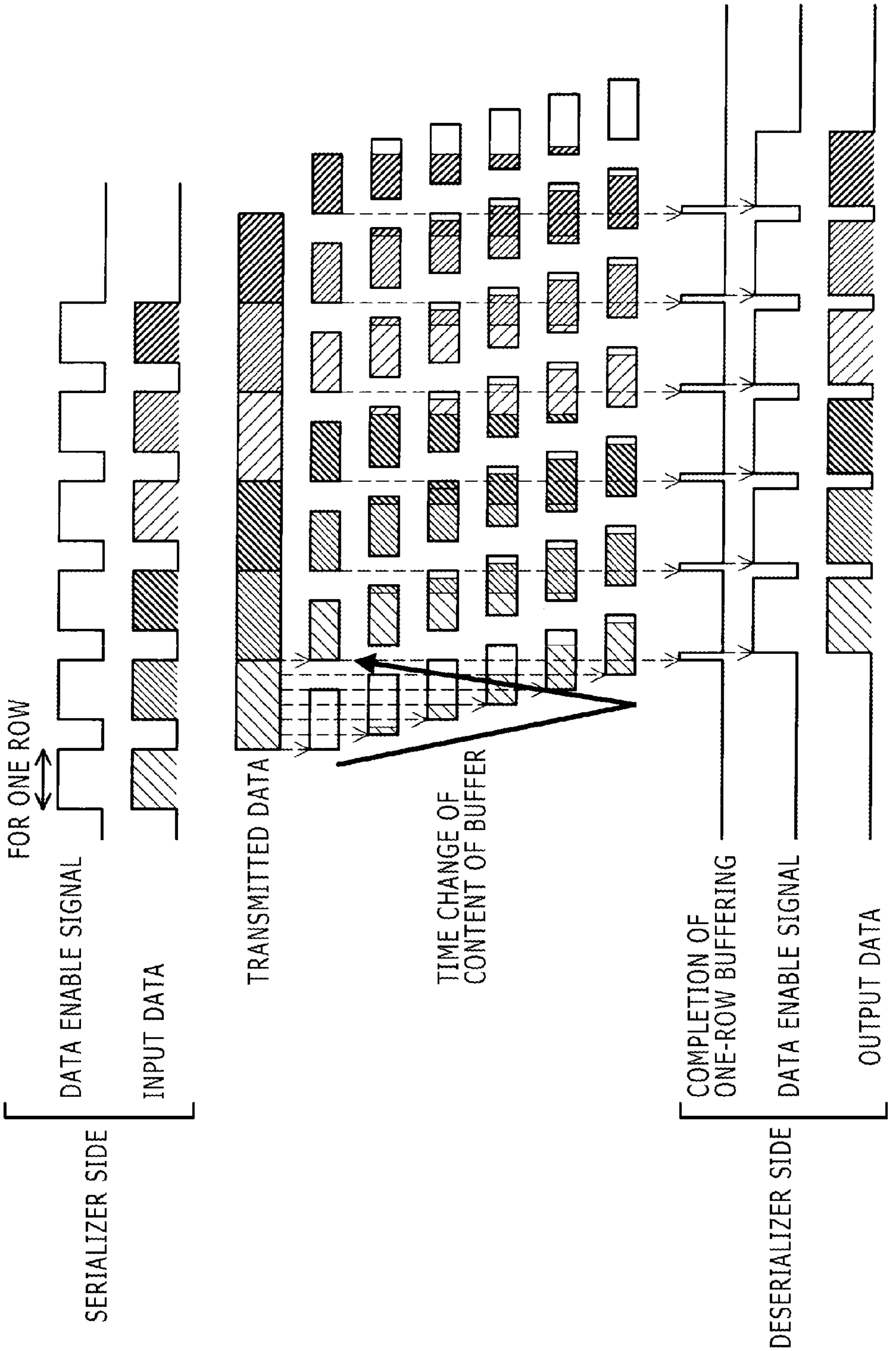
FIG. 10 is an explanatory diagram for explaining a buffering method according to the embodiment.

FIG. 10 shows the configurations of the enable signal and the data signal input on the side of the serializer 150, the configuration of the transmitted data, the configuration of the data signal stored in the buffer 174, and the configurations of the enable signal and the data signal output from the deserializer 170 to the liquid crystal part 104. The part given the same hatching indicates the component of the same data signal.

As already described, the data signal input to the serializer 150 is transmitted to the deserializer 170 in units of the data amount corresponding to the screen data for one row. The data signals transmitted to the deserializer 170 are sequentially stored in the buffer 174 by the buffer managing part 173. The time change of the content of the buffer is shown at the middle rows of FIG. 10. The buffer managing part 173 performs writing to the buffer 174 every time the data signal is input, and does not perform reading of the data signal until data for one row is accumulated. That is, the period until the data for one row is accumulated is treated as the blank period. Furthermore, the buffer managing part 173 outputs the enable signal and the data signal to the data reproducer 175 simultaneously with accumulation of the data for one row.

Using such a method makes it possible to suppress the influence of overflow and underflow by utilizing the buffer 174 having only the storing capacity equivalent to the screen data for one row. As a result, the cost can be reduced.

<3: Summarization>

At last, the technical content relating to the embodiment of the present disclosure will be briefly summarized below. The technical content to be described below can be applied to various information processing devices such as PC, cellular phone, portable game machine, portable information terminal, information home appliance, and car navigation system. In particular, the technical content can be applied to a data input/output device provided inside such an information processing device.

The above-described data input/output device has the following buffer, data receiver, data input part, and data output part. The buffer is a storing part for accumulating data. The data receiver receives data input in synchronization with a first clock in accordance with a second clock whose generation source is different from that of the first clock. The data input part accumulates the data received by the data receiver in the buffer. The data output part sequentially outputs the data accumulated in the buffer in units of a predetermined data amount at the output interval depending on the amount of data accumulated in the buffer.

Input and output of various data are performed inside the above-described information processing device. For example, display data output from a central processing unit is input to a display device. In many cases, the clock used in output of the display data from the central processing unit and the clock used in input of the display data to the display device (utilized also as the clock for displaying, for example) are clocks from the same generation source. However, these two clocks often derive from different generation sources because of the arrangement relationship between the central processing unit and the display device and the design reason. In this case, disturbance of displaying occurs unless the frequencies of both clocks are made to accurately match each other. If expensive generation sources are utilized, the frequencies of both clocks can be made to accurately match each other. However, utilizing expensive generation sources leads to increase in the manufacturing cost.

So, the data input/output device according to the present embodiment has a buffer and adjusts the output interval of data by utilizing the buffer. In particular, the data input/output device according to the present embodiment adjusts the output interval depending on the amount of data accumulated in the buffer. This configuration enables suppression of the influence attributed to the frequency error between the clocks even if the speed of the first clock is higher than that of the second clock or even if the speed of the first clock is lower than that of the second clock. Furthermore, a low-cost generation source can be utilized and thus the manufacturing cost can be reduced. In addition, restrictions on the frequency, accuracy, and correlation of the clocks are eliminated and thus the design cost can be reduced.

(Notes)

The portable terminal 130 is one example of the data input/output device and the information processing device. The serializer 150 is one example of the data receiver. The buffer managing part 173 is one example of the data input part, the data output part, and the control signal output part. The serializer 150 is one example of the first module. The deserializer 170 is one example of the second module. The serial data generator 153 is one example of the serial data transmitter. The parallel data generator 172 is one example of the serial data receiver. The baseband processor 110 is one example of the arithmetic processor. The oscillator 190 is one example of the clock generator. The liquid crystal part 104 is one example of the display part.

Although the preferred embodiment of the present disclosure has been described above with reference to the accompanying drawings, it is obvious that the present disclosure is not limited to the relating examples. It is apparent that those skilled in the art can think of various kinds of change examples or modification examples within the category described in the scope of claims, and it should be understood that these examples also belong to the technical range of the present disclosure naturally.

In the above description, specific numeric values such as 16 MHz, 20 MHz, 80 MHz, multiplication by four, and frequency division to ⅕ are employed. However, these numeric values are one example and should be accordingly changed depending on an embodiment. Furthermore, although the above description has been made with input/output of screen data in mind, the above-described technique can be applied also to input/output of another kind of data. Such a modification is also included in the technical range of the present embodiment naturally.

The present disclosure contains subject matter related to that disclosed in Japanese Priority Patent Application JP 2010-288544 filed in the Japan Patent Office on Dec. 24, 2010, the entire content of which is hereby incorporated by reference.

What is claimed is:

1. A data input/output device comprising:

a buffer configured to accumulate data;

a data receiver configured to receive data input in synchronization with a first clock in accordance with a second clock, wherein a generation source of the second clock is different from a generation source of the first clock;

a data input unit configured to accumulate the received data in the buffer; and a data output unit configured to sequentially output the data accumulated in the buffer at an output interval depending on the amount of data accumulated in the buffer, wherein the data output unit sets the output interval to a predetermined first output interval longer than a predetermined output interval if the amount of data accumulated in the buffer is lesser than a threshold.

2. The data input/output device according to claim 1, wherein the data output unit sets the output interval to a predetermined second output interval shorter than the predetermined output interval if the amount of data accumulated in the buffer is higher than another threshold.

3. The data input/output device according to claim 1, wherein the data output unit manages the amount of data accumulated in the buffer based on a unit of data, and the data output unit sets the output interval to the predetermined first output interval longer than the predetermined output interval if the amount of data accumulated in the buffer is equal to or lesser than N1, and the data output unit sets the output interval to a predetermined second output interval shorter than the predetermined output interval if the amount of data accumulated in the buffer is equal to or larger higher than N2 (N2>N1).

4. The data input/output device according to claim 1, wherein the predetermined data amount is a data amount corresponding to one row of a display screen.

5. The data input/output device according to claim 4, further comprising a control signal output unit configured to output a control signal indicating length of a blank period in which the data is not output by the data output part.

6. The data input/output device according to claim 1, wherein the data receiver sequentially receives data whose unit is the predetermined data amount, and at timing when data of each unit is accumulated in the buffer, the data output part starts output of the data.

7. The data input/output device according to claim 1, further comprising a first module having the data receiver, and a second module that has the buffer, the data input part, and the data output part and is connected to the first module by a predetermined signal line, wherein the first module has a serial data generator that serializes data received by the data receiver to generate serial data, and a serial data transmitter that transmits the serial data via the predetermined signal line, wherein the second module has a serial data receiver that receives serial data transmitted via the predetermined signal line, and a parallel data generator that parallelizes serial data received by the serial data receiver, and the data input unit accumulates, in the buffer, data parallelized by the parallel data generator as data received by the data receiver.

8. The data input/output device according to claim 7, wherein the data is data for displaying, wherein the first module has an arithmetic processor that inputs data in synchronization with the first clock, and a clock generator that generates the second clock, the second module has a display unit that displays an image based on the data, the data receiver receives data input from the arithmetic processor in synchronization with the first clock in accordance with the second clock generated by the clock generator, and the data output unit outputs data to the display unit.

9. An information processing device comprising:

an arithmetic processor configured to input data in synchronization with a first clock;

a clock generator configured to generate a second clock;

a data receiver configured to receive data input from the arithmetic processor in synchronization with the first clock in accordance with the second clock;

a data input unit configured to accumulate the received data in a buffer;

a data output unit configured to sequentially output the data accumulated in the buffer at an output interval depending on the amount of data accumulated in the buffer, wherein the data output unit sets the output interval to a predetermined first output interval longer than a predetermined output interval if the amount of data accumulated in the buffer is lesser than a threshold; and a display unit configured to display an image based on the data output by the data output unit.

10. A data input/output method of a data input/output device having a buffer for accumulating data, the method comprising:

receiving data input in synchronization with a first clock in accordance with a second clock, wherein a generation source of the second clock is different from a generation source of the first clock;

accumulating the received data in the buffer; and sequentially outputting the data accumulated in the buffer at an output interval depending on the amount of data accumulated in the buffer, wherein the output interval is set to a predetermined first output interval longer than a predetermined output interval if the amount of data accumulated in the buffer is lesser than a threshold.

11. The data input/output device according to claim 1, wherein the data output unit is operable to output the data accumulated in the buffer in the same order as that of the data accumulated in the buffer.

12. The data input/output device according to claim 1, further comprising a frequency divider operable to divide the frequency of the data input received in synchronization with the first clock in accordance with the second clock.

13. The data input/output device according to claim 1, wherein the data output unit is operable to sequentially output the data accumulated in the buffer at an output interval depending on the amount of data accumulated in the buffer in such a manner that a predetermined data amount is a unit of the output.

* * * * *